United States Patent
Katoh et al.

(10) Patent No.: US 7,874,048 B2
(45) Date of Patent: Jan. 25, 2011

(54) CLIP

(75) Inventors: Makoto Katoh, Toyota (JP); Toshio Iwahara, Okazaki (JP); Haruhisa Kamiya, Anjo (JP); Tetsuya Ogino, Toyota (JP); Kosei Asano, Aichi-ken (JP); Minoru Shibata, Aichi-ken (JP); Katsuhiro Katagiri, Aichi-ken (JP); Hiroshi Suyama, Aichi-ken (JP); Yasuhiro Sakakibara, Aichi-ken (JP)

(73) Assignee: Saiwa Kasei Industry Co., Ltd., Okazaki-Shi (JP)

( * ) Notice: Subject to any disclaimer, the term of this patent is extended or adjusted under 35 U.S.C. 154(b) by 366 days.

(21) Appl. No.: 11/922,407

(22) PCT Filed: Jul. 7, 2006

(86) PCT No.: PCT/JP2006/313610
§ 371 (c)(1),
(2), (4) Date: Jan. 14, 2008

(87) PCT Pub. No.: WO2007/007687
PCT Pub. Date: Jan. 18, 2007

(65) Prior Publication Data
US 2009/0031540 A1     Feb. 5, 2009

(30) Foreign Application Priority Data
Jul. 12, 2005    (JP) .............................. 2005-203368

(51) Int. Cl.
F16B 19/00    (2006.01)
(52) U.S. Cl. .......................................... 24/297; 24/453
(58) Field of Classification Search .................. 24/297, 24/453; 411/508–510; 52/716.7, 718.06, 52/718.03
See application file for complete search history.

(56) References Cited

U.S. PATENT DOCUMENTS

2005/0155191 A1 *   7/2005   Asano et al. ................... 24/297

FOREIGN PATENT DOCUMENTS

| DE | 90 14 254.3 U1 | 2/1991 |
|---|---|---|
| DE | 201 11 977 U1 | 11/2001 |
| EP | 0 860 616 A1 | 8/1998 |
| EP | 1 134 432 A2 | 9/2001 |
| GB | 2 334 298 A | 8/1999 |
| GB | 2 381 289 A | 4/2003 |
| JP | U 63-104710 | 7/1988 |
| JP | A 11-70838 | 3/1999 |
| JP | A 2001-50228 | 2/2001 |
| JP | A 2001-50229 | 2/2001 |
| JP | A-2002-106519 | 4/2002 |

* cited by examiner

Primary Examiner—James R Brittain
(74) Attorney, Agent, or Firm—Oliff & Berridge PLC

(57) ABSTRACT

When an operation wall of an inner member is inserted into an insertion portion of an outer member and an engagement piece does not receive a cam operation due to a slanted cam portion, contact pieces of the outer member do not correspond to a positioning hole of the inner member and are located in a position so as not to be inserted into the positioning hole. When the outer member is inserted into an attachment hole of an attachment receiving member with maintaining a state where the engagement piece does not receive the cam operation due to the slanted cam portion, the contact pieces are elastically deformed inwardly and located in a position so as to be inserted into the positioning hole.

4 Claims, 8 Drawing Sheets

CLIP

BACKGROUND

1. Field of the Invention

The present invention relates to a clip for use in attaching an attachment member such as a console box and an instrument panel to an attachment receiving member such as an automobile body. In particular, the present invention relates to a clip that reliably prevents an inner member and an outer member from being erroneously locked before attaching the outer member to the attachment receiving member and enables attachment of the attachment member to the attachment receiving member in an extremely easy one-touch operation while the inner member and the outer member, which form the clip, are always handled integrally with each other in a provisionally locked state.

2. Description of Related Art

Conventionally, various kinds of clips have been proposed for use in attaching a console box, instrument panel, and the like to various kinds of panels constituting an automobile body. For example, there is disclosed a console device to be attached on a floor of a vehicle body in Japanese Unexamined Patent Publication No. 11-70838. In attaching the console device on the floor of the vehicle body, a fitting hole formed on a flange of the console box and a through hole formed on a seat portion are aligned to two fitting holes formed on the floor of the vehicle body, and in this state, a clip comprising an outer member and an inner member is inserted through the holes.

Japanese Unexamined Patent Publication No. 11-70838 (Patent Document 1), paragraphs page 4 in the specification and FIG. 2 disclose a console device In the clip comprising the outer member and inner member described in the Patent Document 1, when the inner member is withdrawn from the outer member, the diameter of the outer member is decreased to enable the clip to be detached from the respective fitting holes of the floor and the flange, the fitting hole of the floor, and the through hole of the seating portion. When the inner member is inserted into the outer member, the diameter of the outer member is enlarged to restrict the clip by the respective fitting holes and through hole, so as to fasten the console box to the floor of the vehicle body.

BRIEF SUMMARY OF THE INVENTION

When the console box is fastened to the floor of the vehicle body by use of the clip for use in the console device described in the Patent Document 1, after the inner member is pulled upwardly and the clip with the outer member having a reduced diameter is inserted through the through hole of the seating portion, the inner member is required to be pushed from upward and inserted into the outer member so as to enlarge the diameter of the outer member.

To fasten the console box to the floor of the vehicle body, first of all, it is required to take an operation of pulling out the inner member from the outer member, and in this state, inserting the clip through the fitting holes and through holes, and subsequently, to take an operation of inserting the inner member to the outer member by depressing the inner member into the outer member. These operations are much troublesome, and lead to a problem that much time is required for fastening the console box to the floor of the vehicle body.

The present invention has been made to solve the problems described above, and an objective thereof is to provide a clip which is capable of reliably preventing the inner member and the outer member, which form the clip, from being erroneously in a locked state before the outer member being attached to the attachment receiving member, in a state where the inner member is always handled integrally with the outer member in a provisionally locked state, and which also enables attachment of the attachment member to the attachment receiving member in an extremely easy one-touch operation.

To achieve the object, according to the clip as set forth in an embodiment of the invention, comprising: an inner member provided on an attachment member and having an operation wall; and an outer member having an insertion portion where the operation wall of the inner member is inserted and having an engagement piece which elastically deforms as the operation wall of the inner member is inserted into the insertion portion, wherein the outer member is inserted into an attachment hole of an attachment receiving member and the operation wall of the inner member is inserted into the insertion portion of the outer member such that the engagement piece of the outer member is elastically deformed and the attachment member is attached to the attachment receiving member, the clip is characterized in that: the outer member has elastically deformable contact pieces which extend from a surface of the outer member where the engagement piece is formed and from a surface opposite to the surface, and the inner member has a slanted cam portion which is formed on one end surface of the operation wall and a positioning hole which is formed so as to correspond to the contact pieces of the outer member, wherein the contact pieces do not correspond to the positioning hole and are located in a position so as not to be inserted in the positioning hole in a state where the operation wall of the inner member is inserted into the insertion portion of the outer member and the engagement piece does not receive a cam operation due to the slanted cam portion, and when the outer member is inserted into the attachment hole of the attachment receiving member with maintaining the above state, the contact pieces are elastically deformed inwardly and located in a position so as to be inserted into the positioning hole.

According to the clip as set forth in another aspect of the invention, the operation wall of the inner member has an engagement groove which is formed next to the slanted cam portion and an engagement hole which is formed next to the engagement groove, and the outer member has an engagement projection which is formed next to the engagement piece, and the engagement projection is engaged with the engagement groove in a state where the operation wall of the inner member is inserted into the insertion portion of the outer member and the engagement piece does not receive the cam operation due to the slanted cam portion, and the engagement piece is engaged with the engagement hole in a state where the operation wall is further inserted into the insertion portion and the engagement piece receives the cam operation due to the slanted cam portion so as to be elastically deformed outwardly.

In the clip, as set forth in another aspect of the invention, it is preferable that a thin plate portion is formed at a distal end of the slanted cam portion, and the engagement piece contacts the thin plate portion in a state where the engagement piece does not receive the cam operation due to the slanted cam portion.

According to the clip as set forth in the above embodiment, the contact pieces of the outer member do not correspond to the positioning hole and located in a position so as not to be inserted into the positioning hole in a state where the operation wall of the inner member is inserted into the insertion portion of the outer member and the engagement piece does not receive the cam operation due to the slanted cam portion. Therefore, before the outer member having the engagement piece which does not receive the cam operation due to the slanted cam portion is attached to the attachment receiving member, it is surely prevented that the contact pieces are inserted into the positioning hole and the inner member and the outer member are erroneously locked with each other. The contact pieces of the outer member are elastically deformed inwardly and located in a position so as to be inserted into the positioning hole when the outer member is inserted into the attachment hole of the attachment receiving member with maintaining a state where the engagement piece does not receive the cam operation due to the slanted cam portion. Therefore, when the outer member is attached to the attachment receiving member, the contact pieces of the outer member are inserted into the positioning hole of the inner member. Thereby, the inner member and the outer member are locked with each other.

Thus, it is surely prevented that the outer member and the inner member are erroneously locked with each other while the clip is transported with maintaining the inner member integrally with the outer member in a provisionally locked state or while the outer member is inserted with respect to the inner member.

When the outer member and the inner member which are maintained integrally with each other in a provisionally locked state are inserted into the attachment hole of the attachment receiving member, the contact pieces are elastically deformed inwardly and located in a position so as to be inserted into the positioning hole. Therefore, the contact pieces can be inserted into the positioning hole when the outer member and the inner member are inserted into the attachment hole of the attachment receiving member. This safely maintains the provisionally locked state of the outer member and the inner member.

According to the clip as set forth in another aspect of the invention, the engagement projection is engaged with the engagement groove in a state where the operation wall of the inner member is inserted into the insertion portion and the engagement piece does not receive the cam operation due to the slanted cam portion. Therefore, the outer member and the inner member which are provided on the attachment member can be always handled integrally with each other in the provisionally locked state.

In this state, the engagement piece of the outer member is not elastically deformed because it does not receive the cam operation due to the slanted cam portion. Therefore, the elastic force of the engagement piece is surely prevented from decreasing while the outer member and the inner member are maintained integrally with each other.

When the operation wall is further inserted into the insertion portion in a state where the engagement projection is engaged with the engagement groove and the engagement piece receives the cam operation so as to be elastically deformed outwardly, the engagement projection is engaged with the engagement hole so as to be in a locked state. After the inner member and the outer member which are maintained integrally with each other in the provisionally locked state are inserted into the attachment hole of the attachment receiving member and the clip is supported by the attachment receiving member, the inner member is pressed toward the attachment receiving member with the attachment member such that the operation wall is further inserted into the insertion portion of the outer member. This simple operation enables the attachment member to be attached to the attachment receiving member via the outer member and the inner member of the clip.

Figure 1:
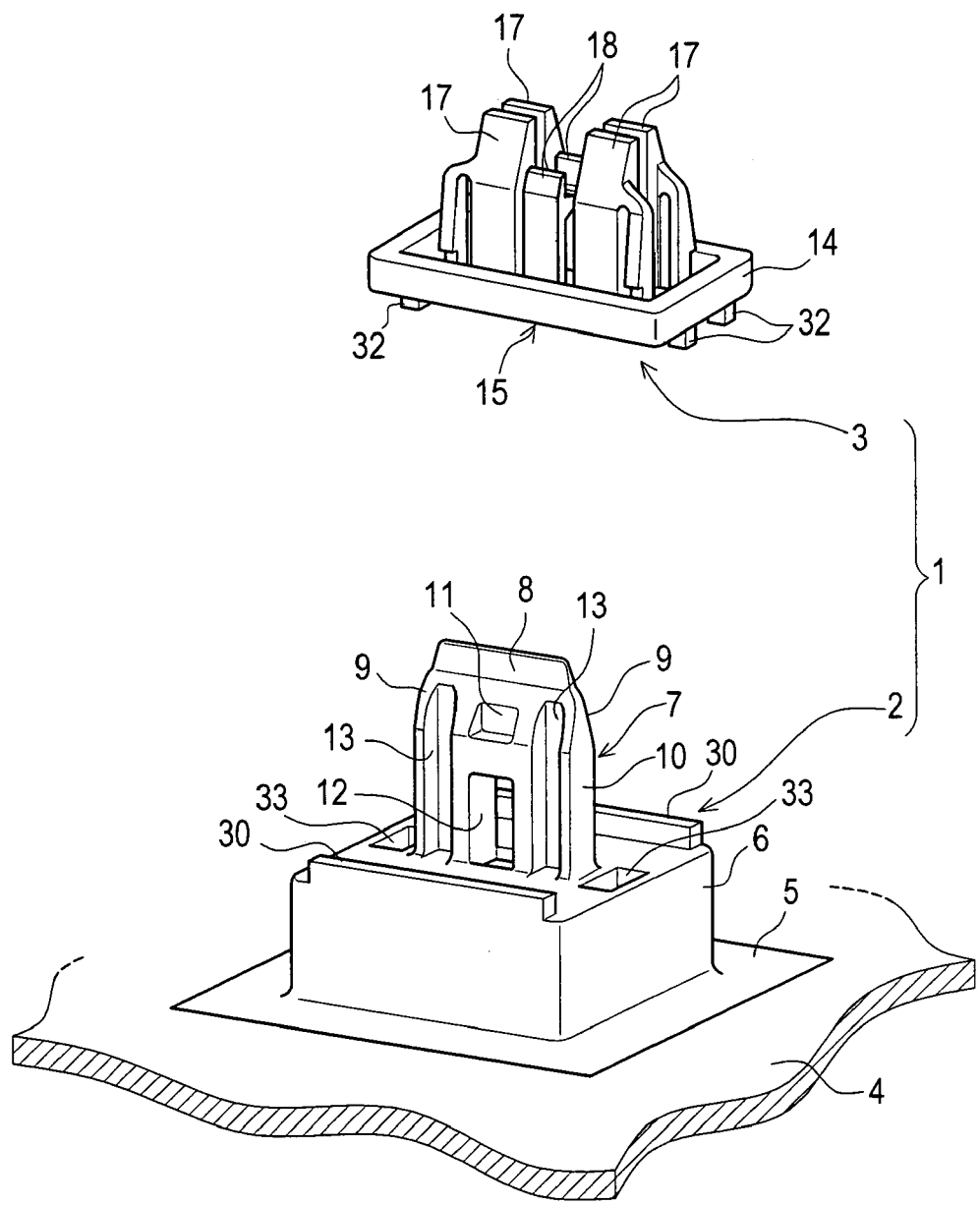
FIG. 1 is an exploded perspective view schematically showing an inner member and an outer member, which form a clip according to this embodiment.

EXPLANATION OF REFERENCE NUMERALS 1 clip
2 inner member
3 outer member
4 attachment member
7 operation wall
8 thin plate portion
9 slanted cam portion
10 flat plate wall portion
11 engagement groove
12 engagement hole
14 peripheral wall
15 bottom portion
16 insertion portion
17 engagement piece
18 engagement piece
19 first projection
21 attachment receiving member 22 attachment hole
32 contact piece
33 positioning hole

DETAILED DESCRIPTION OF EXEMPLARY EMBODIMENTS

Hereinafter, a clip according to the present invention will be described in detail with reference to the drawings based on an embodiment which has embodied the present invention. First, an entire structure related to a clip according to this embodiment will be explained with reference to FIG. 1. FIG. 1 is an exploded view schematically showing an inner member and an outer member which form the clip according to a first embodiment. In FIG. 1, the clip 1 basically comprised of the inner member 2 and the outer member 3.

Figure 2A:
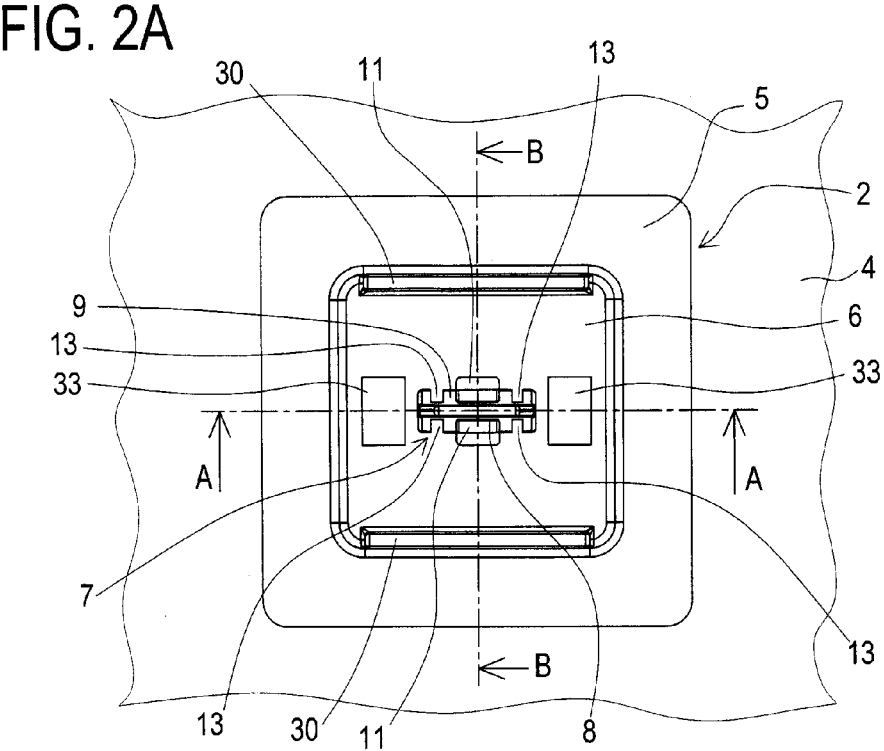
FIG. 2A is a plane view showing the inner member.
Figure 2B:
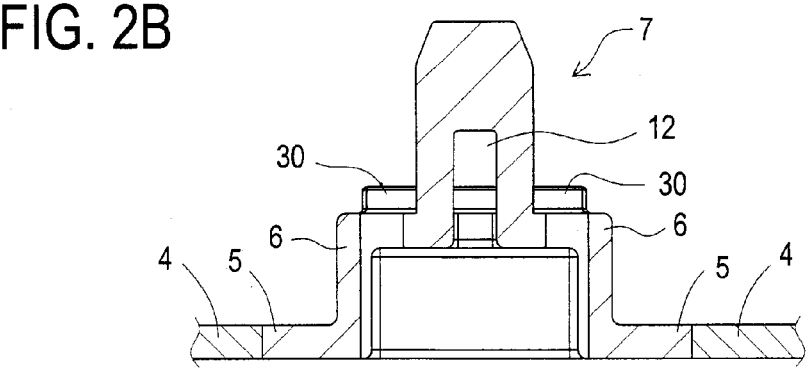
FIG. 2B is a cross-sectional view showing the inner member taken along the arrow A-A of FIG. 2A.
Figure 2C:
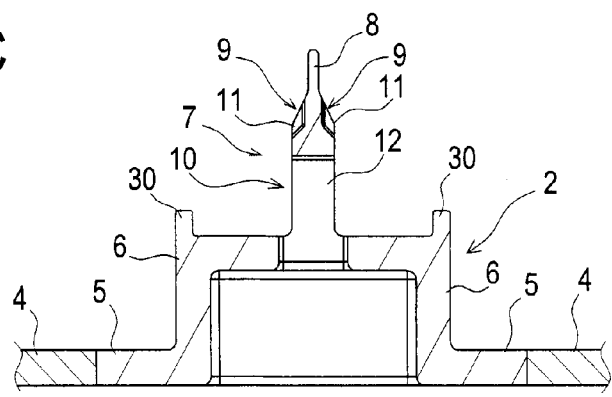
FIG. 2C is a cross-sectional view showing the inner member taken along the arrow B-B of FIG. 2A.

A configuration of the inner member 2 will be explained with reference to FIG. 1 and FIGS. 2A to 2C. FIGS. 2A to 2C are explanation views showing the inner member in different ways. FIG. 2A is a plane view of the inner member, FIG. 2B is a cross-sectional view of the inner member taken along A-A line of FIG. 2A, and FIG. 2C is a cross-sectional view of the inner member taken along B-B line of FIG. 2A.

In FIGS. 1 and 2, the inner member 2 is made of various kinds of resins such as polypropylene and integrally molded with an attachment member 4 such as a console box and instrumental panel. The inner member 2 is provided on one surface of the attachment member (an upper surface in FIG. 1) and has a flat plate portion 5 which is integrally molded with the attachment member 4 with various molding methods. The flat plate portion 5 has a base body 6 which is formed in a box. An operation wall 7 extends from a substantially center of an upper surface of the base body 6. A pair of walls 30 extend from side peripheries of the upper surface of the base body 6 so as to face with each other.

The operation wall 7 includes a thin plate portion 8, two slanted cam portions 9 and a flat plate wall portion 10 in this order from its distal end. The slanted cam portions 9 are formed in a tower-like shape and continuously formed downwardly from the thin plate portion 8. The flat plate wall portion 10 is continuously formed from each of the slanted cam portions 9. An engagement groove 11 is formed on each slanted cam portion 9. Further, an elongated engagement hole 12 is formed at a substantially center of the flat plate wall portion 10 with respect to a width direction and next to the engagement groove 11. The engagement groove 11 and the engagement hole 12 are engaged with engagement projections (described later) of the outer member 3 successively according to an insertion degree of the operation wall 7 with respect to the outer member 3. Two reinforcing grooves 13 are formed on both sides with respect to the engagement groove 11 and the engagement hole 12. The reinforcing grooves 13 are formed on both sides of the operation wall 7. Each of the reinforcing grooves 13 is provided for improving strength of the operation wall 7.

Figure 3A:
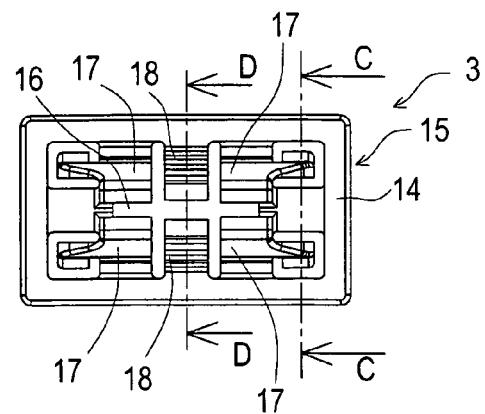
FIG. 3A is a plane view showing the outer member.
Figure 3B:
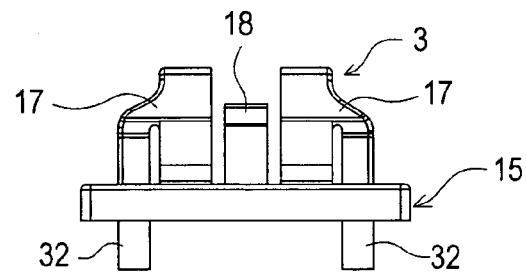
FIG. 3B is a side view showing the outer member.
Figure 3C:
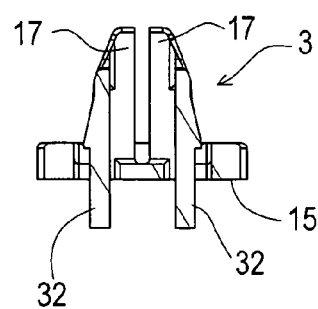
FIG. 3C is a cross-sectional view showing the outer member taken along the arrow C-C of FIG. 3A.
Figure 3D:
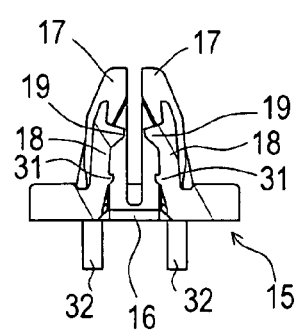
FIG. 3D is a cross-sectional view showing the outer member taken along the arrow D-D of FIG. 3A.

Next, the outer member 3 will be explained with reference to FIG. 1 and FIGS. 3A to 3D. FIGS. 3A to 3D are explanation views showing the outer member in different ways. FIG. 3A is a plane view of the outer member, FIG. 3B is a side view of the outer member, FIG. 3C is a cross-sectional view of the outer member taken along a C-C line of FIG. 3A, and FIG. 3D is a cross-sectional view of the outer member taken along a D-D line of FIG. 3A.

The outer member 3 is integrally formed from various resins, for example, polypropylene. The outer member 3 includes a bottom portion 15 having a peripheral wall 14. An insertion portion 16 is formed at a substantially center of the bottom portion 15 with respect to a width direction. As described below, the operation wall 7 of the inner member is inserted into the insertion portion 16. Further, on both sides of the insertion portion 16, two pairs of (four) engagement pieces 17 are extended from an upper surface of the bottom portion 15. Each of the engagement pieces 17 is elastically deformable outwardly as the operation wall 7 is inserted into the insertion portion 16.

On both sides of the insertion portion 16 and between the engagement pieces 17 along a longitudinal direction of the bottom portion 15, a pair of engagement pieces 18 are extended from the upper surface of the bottom portion 15. The engagement pieces 18 are elastically deformable. A first projection 19 and a second projection 31 (refer to FIG. 3D) are formed on each engagement piece 18. Each of the first projections 19 is elastically engaged with the engagement groove 11 and the engagement hole 12 which are formed on the operation wall 7 of the inner member 2. Each of the second projections 31 is engaged with the engagement hole 12 while the first projection 19 being engaged with the engagement groove 11.

Two pairs of (four) contact pieces 32 are integrally formed with the bottom portion 15. The contact pieces 32 are formed on four corners of a surface which is an opposite side where the engagement pieces 17 and the engagement pieces 18 are formed, that is, a rear surface of the bottom portion 15.

Two positioning holes 33 are formed on the upper surface of the base body 6 of the inner member 2 such that each of the positioning holes 33 corresponds to a pair of contact pieces 32 which are located along a short side of the bottom portion 15.

As will be described later, in a provisionally locked state in which the first projection 19 of each engagement piece 18 of the outer member 3 is engaged with the engagement groove 11 on the operation wall 7 of the inner member 2 and each engagement piece 17 is not receive a cam operation due to the slanted cam portion 9 of the operation wall 7, each pair of contact pieces 32 do not correspond to the positioning hole 33 and are located so as not to be inserted into the positioning hole 33. Therefore, in the provisionally locked state, each pair of contact pieces 32 are not inserted into the positioning hole 33.

Figure 4:
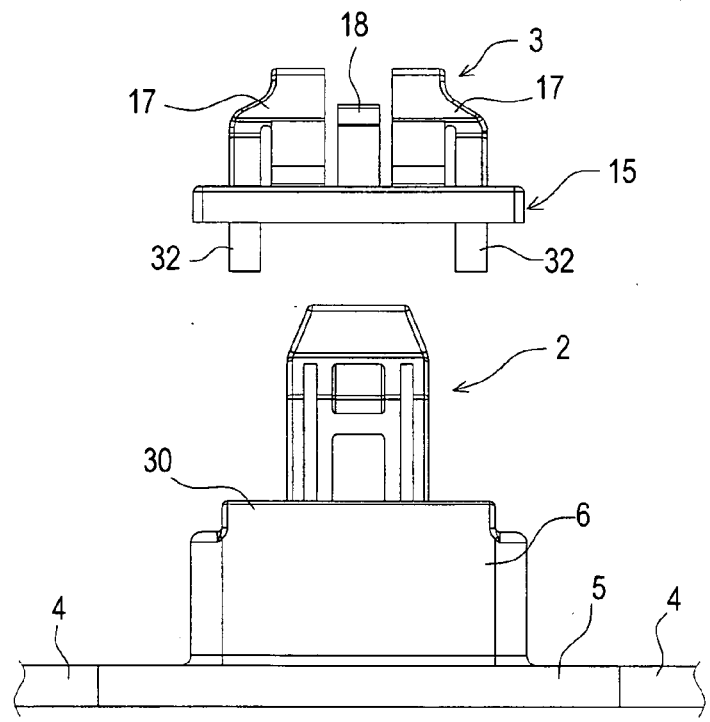
FIG. 4 is a cross-sectional view taken along the arrow A-A of FIG. 2A and taken along a width direction of an operation wall.
Figure 5:
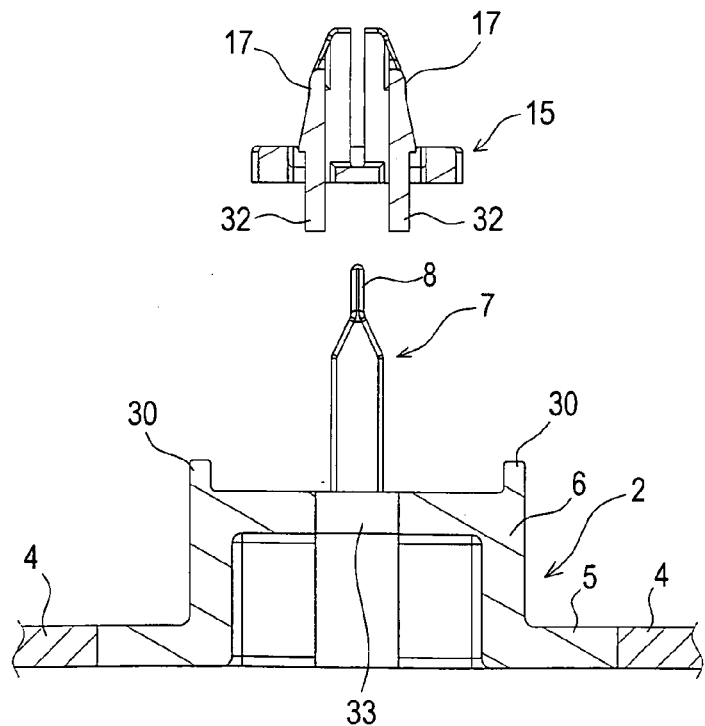
FIG. 5 is a cross-sectional view taken along the arrow C-C of FIG. 3A and taken along a thickness direction of the operation wall.
Figure 6:
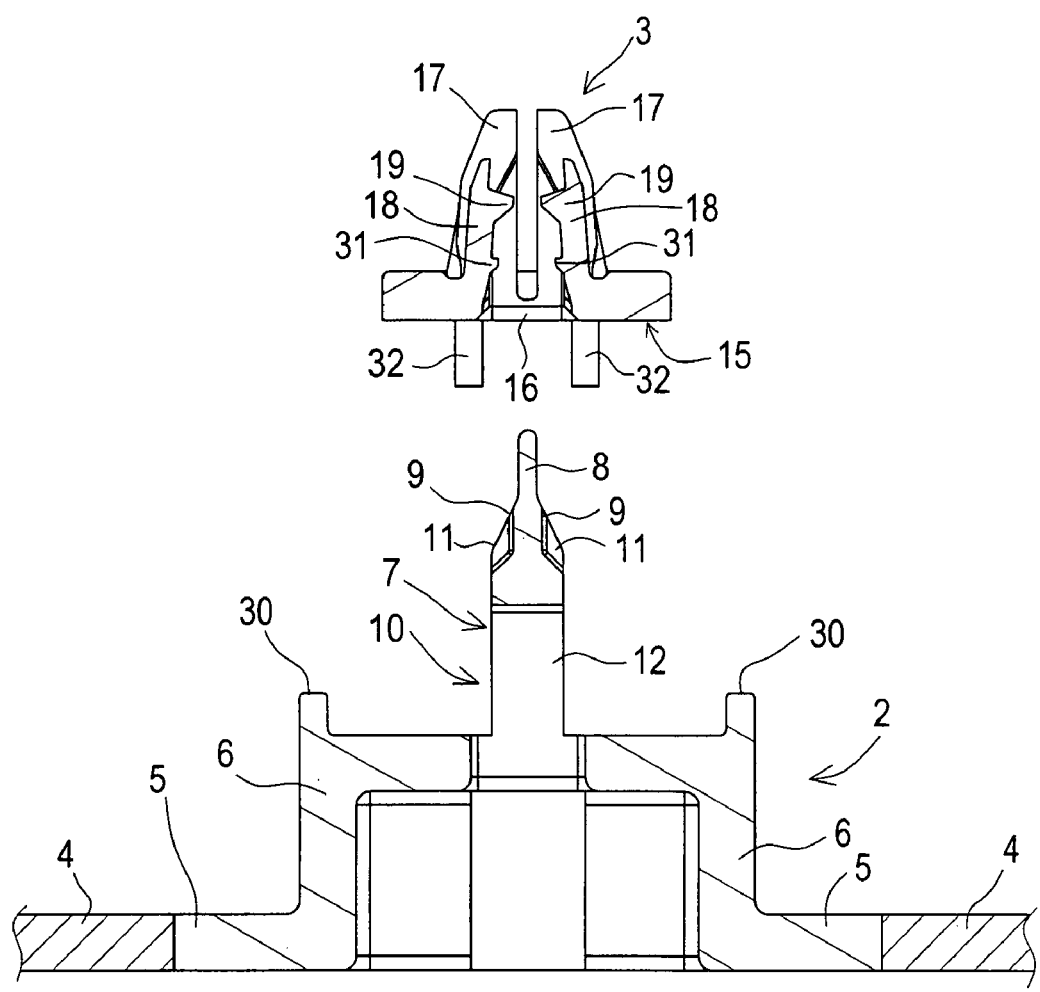
FIG. 6 is a cross-sectional view taken along the arrow D-D of FIG. 3A and taken along a thickness direction of the operation wall.
Figure 7:
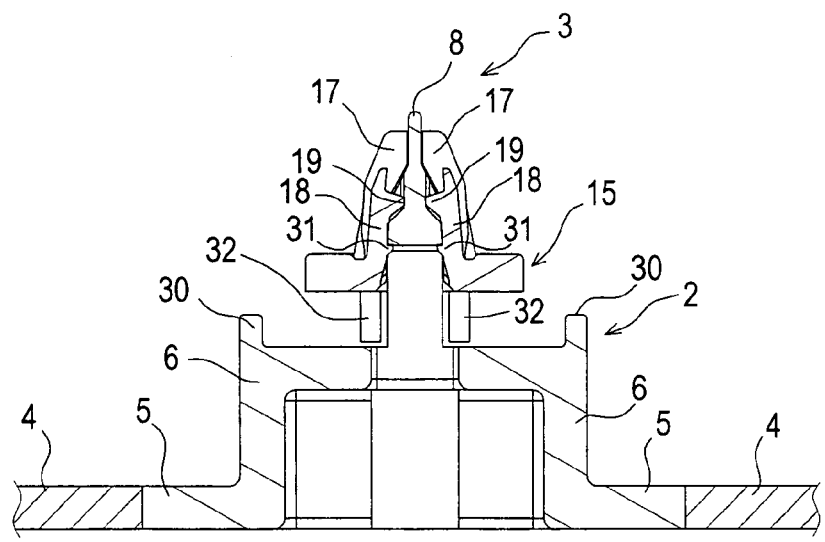
FIG. 7 is a cross-sectional view taken along the arrow D-D of FIG. 3A and taken along a width direction of the operation wall.
Figure 8:
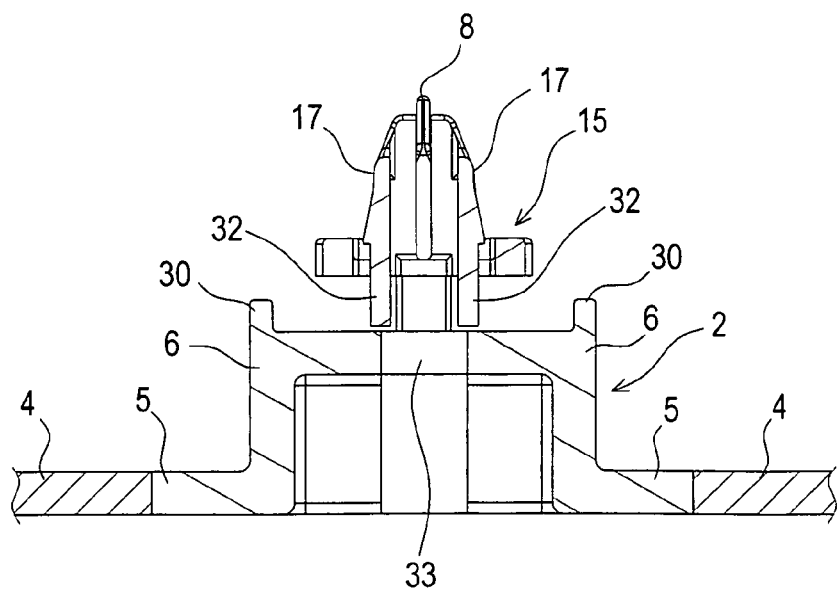
FIG. 8 is a cross-sectional view taken along the arrow C-C of FIG. 3A and taken along a thickness direction of the operation wall.
Figure 9:
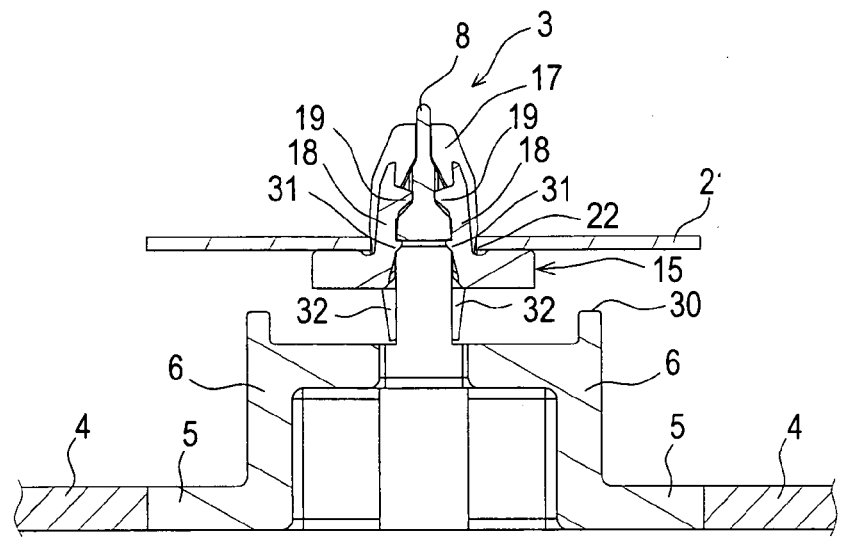
FIG. 9 is a cross-sectional view taken along the arrow D-D of FIG. 3A and taken along a width direction of the operation wall.
Figure 10:
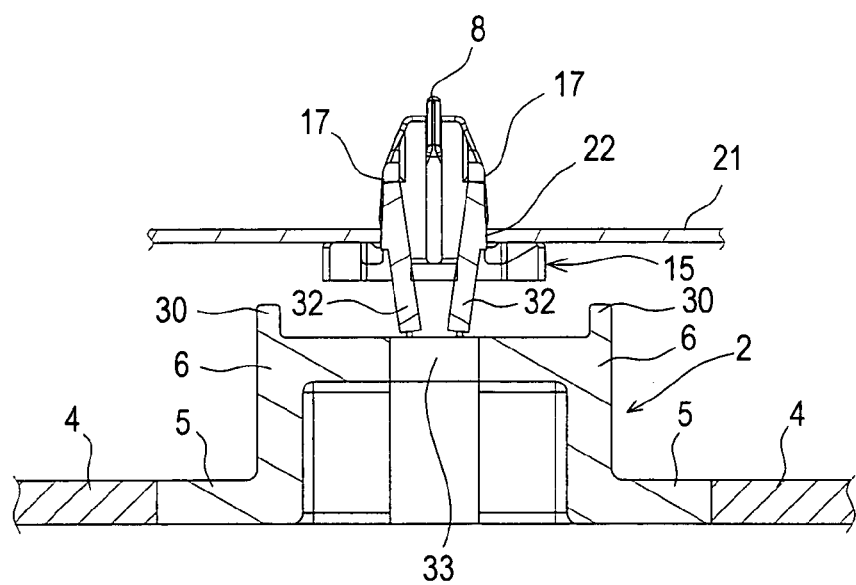
FIG. 10 is a cross-sectional view taken along the arrow C-C of FIG. 3A and taken along a thickness direction of the operation wall.
Figure 11:
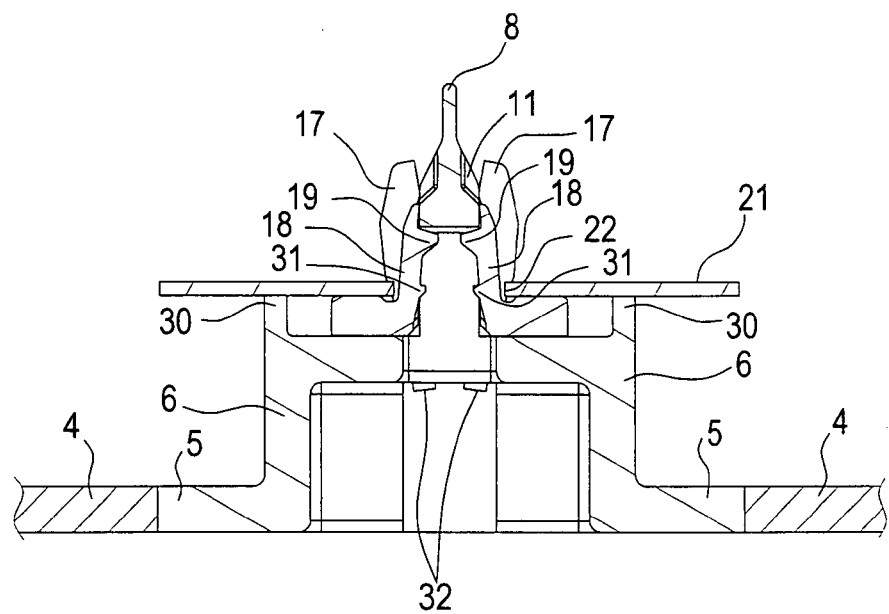
FIG. 11 is a cross-sectional view taken along the arrow D-D of FIG. 3A and taken along a width direction of the operation wall.
Figure 12:
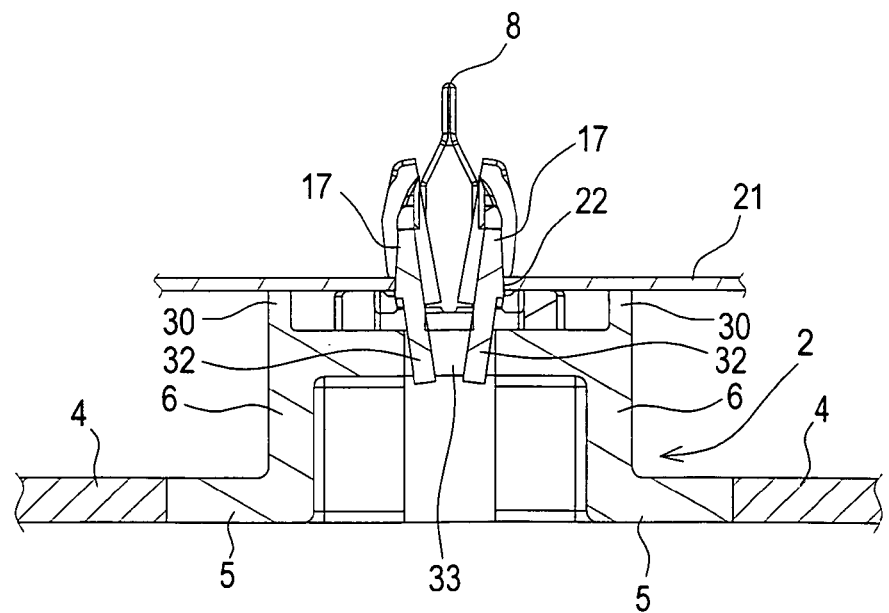
FIG. 12 is a cross-sectional view taken along the arrow C-C of FIG. 3A and taken along a thickness direction of the operation wall.

A method for attaching the attachment member 4 to the attachment receiving member, which is a metal plate (body) of a vehicle body, via the clip 1 which is comprised of the inner member 2 and the outer member 3 will be explained with reference to FIGS. 4 to 12. FIGS. 4 to 6 show a state before the inner member is attached to the outer member, FIG. 4 is a cross-sectional view taken along an A-A line of FIG. 2A, which is taken along a width direction of the operation wall, FIG. 5 is a cross-sectional view taken along a C-C line of FIG. 3A, which is taken along a thickness direction of the operation wall, and FIG. 6 is a cross-sectional view taken along a D-D line of FIG. 3A, which is taken along a thickness direction of the operation wall. FIGS. 7 and 8 are explanation views showing a provisionally locked state in which the projection of the engagement piece of the outer member is engaged with the engagement groove of the inner member and the inner member and the outer member are provisionally locked with each other, FIG. 7 is a cross-sectional view taken along a D-D line of FIG. 3A, which is taken along a width direction of the operation wall, and FIG. 8 is a cross-sectional view taken along a C-C line of FIG. 3A, which is taken along a thickness direction of the operation wall. FIGS. 9 and 10 are explanation views showing a state in which the provisionally locked inner member and outer member are inserted into the attachment hole of the attachment receiving member, FIG. 9 is a cross-sectional view taken along a D-D line of FIG. 3A, which is taken along a width direction of the operation wall, and FIG. 10 is a cross-sectional view taken along a C-C line of FIG. 3A, which is taken along a thickness direction of the operation wall. FIGS. 11 and 12 are explanation views showing a state in which the projection of the engagement piece of the outer member is engaged with the engagement hole of the inner member such that the outer member and the inner member are locked and the attachment member is attached to the attachment receiving member, FIG. 11 is a cross-sectional view taken along a D-D line of FIG. 3A, which is taken along a width direction of the operation wall, and FIG. 12 is a cross-sectional view taken along a C-C line of FIG. 3A, which is taken along a thickness direction of the operation wall.

In attaching the attachment member 4 to the attachment receiving member with using the clip 1 according to this embodiment, as shown in FIGS. 4 to 6, the operation wall 7 of the inner member 2 is located so as to correspond to the insertion portion 16 of the outer member 3. Then, the outer member 3 is moved toward the operation wall 7 such that the operation wall 7 of the inner member is inserted into the insertion portion 16. Thereby, the first projection 19 formed on each engagement piece 18 of the outer member 3 is engaged with the engagement groove 11 of the operation wall 7, and the second projection 31 is engaged with the engagement hole 12. At this time, each engagement piece 17 is contacted to the both sides of the thin plate portion 8 of the operation wall 7. FIGS. 7 and 8 show this state.

As shown in FIGS. 7 and 8, in a state where the first projection 19 formed on each engagement piece 18 of the outer member 3 is engaged with the engagement groove 11 on the operation wall 7 and the second projection 31 is engaged with the engagement hole 12, each engagement piece 17 is only contacted to both surfaces of the thin plate portion 8 of the operation wall 7 without receiving the cam operation due to each slanted cam member 9 of the operation wall 7 of the inner member 2. Therefore, each engagement piece 17 maintains substantially its original state without being elastically deformed. In a state where each engagement piece 17 of the outer member 3 does not receive the cam operation due to each slanted cam member 9, the first projection 19 of the engagement piece 18 is engaged with the engagement groove 11 and the second projection 31 is engaged with the engagement hole 12 such that the inner member 2 and the outer member 3 are provisionally locked with each other. Accordingly, the inner member 2 and the outer member 3 which are attached to the attachment member 4 can be always handled integrally with each other.

In this state, the inner member 2 and the outer member 3 are provisionally locked with each other, as described before. Each pair of the contact pieces 32, which include the four contact pieces 32 formed on the boom portion 15 of the outer member 3, are slightly spaced from the positioning hole 33 of the inner member 2 and the outer portions of each pair of contact pieces 32 do not correspond to the positioning hole 33. Therefore, the outer portions of each pair of contact pieces 32 are located so as not to be inserted into the positioning hole 33.

Therefore, in the provisionally locked state in which the engagement piece 18 is engaged with the engagement groove 11 such that the engagement piece 17 of the outer member 3 does not receive the cam operation due to the slanted cam portion 9 on the operation wall 7 of the inner member 2, it is prevented that the outer member 3 and the inner member 2 are erroneously locked while the clip 1 is transported with the inner member 2 being maintained integrally with the outer member 3. Also, in the provisionally locked state, it is prevented that the outer member and the inner member 2 are erroneously locked while the outer member 3 is inserted into the inner member 2.

Then, in the provisionally locked state in which the outer member 3 is provisionally locked to the inner member 2 as described above, the attachment member 4 is pressed from its surface which is opposite to a surface of the attachment member 4 where the inner member 2 is provided such that the outer member 3 and the inner member 2 are inserted into the attachment hole 22 of the attachment receiving member 21. This insertion operation is executed until the upper surface of the peripheral wall portion 14 formed on the bottom portion 15 of the outer member 3 abuts against the rear surface of the peripheral edge of the attachment hole 22 of the attachment receiving member 21. This state is shown in FIGS. 9 and 10. In the state shown in FIG. 9, the first projection 19 of each engagement piece 18 of the outer member 3 is engaged with the engagement groove 11 on the operation wall 7 of the inner member 2, the second projection 31 is engaged with the engagement hole 12, and the upper surface of the peripheral wall 14 of the bottom portion 15 of the outer member 3 abuts against the rear surface of the peripheral edge of the attachment hole 22 of the attachment receiving member 21.

Thus, in a state where the provisionally locked inner member 2 and outer member 3 are inserted into the attachment hole 22 of the attachment receiving member 21, each engagement piece 17 receives restriction force due to the attachment hole 22 at the center in its vertical direction, as shown in FIG. 10. Accordingly, the upper half of each engagement piece 17 is elastically deformed outwardly and the lower half of each engagement piece 17 is elastically deformed inwardly. As a result, each pair of contact pieces 32 are elastically deformed inwardly, as shown in FIG. 11, so as to be positioned to be inserted into the positioning hole 33. When the outer member 3 and the inner member 2 are inserted into the attachment hole 22 of the attachment receiving member 21 while the outer member 3 and the inner member 2 being maintained in the provisionally locked state, each pair of contact pieces 32 are elastically deformed to be located in a position so as to be inserted into the positioning hole 33. Therefore, when the outer member 3 and the inner member 2 are inserted into the attachment hole 22 of the attachment receiving member 21, the contact pieces 32 are able to be inserted into the positioning hole 33. Thus, the provisionally locked state of the outer member 3 and the inner member 2 can be maintained quite safely.

From the state shown in FIGS. 9 and 10, the attachment member 4 is pressed toward in a direction in which the outer member 3 and the inner member 2 are further inserted into the attachment hole 22 (in the upper direction in FIGS. 9 and 10). At this time, since the upper surface of the peripheral wall portion 14 of the outer member 3 contacts the peripheral edge of the attachment hole of the attachment receiving member 21, the outer member 3 is not moved when the attachment member 4 being pressed.

The operation wall 7 of the inner member 2 is inserted into the attachment hole 22 toward the attachment receiving member 21. According to this insertion operation, each engagement piece 17 of the outer member 3 gradually receives the cam operation due to each slanted cam portion 9 of the operation wall 7 of the inner member 2 so as to be elastically deformed outwardly. When each engagement piece 17 is further elastically deformed outwardly by the cam operation due to the slanted cam portion 9, the first projection 19 of each engagement projection 18 is engaged with the engagement hole 12 of the operation wall of the inner member 2. This state is shown in FIGS. 11 and 12.

In the state shown in FIGS. 11 and 12, the first projection 19 of each engagement piece 18 of the outer member 3 is engaged with the engagement hole 12 of the operation wall 7 of the inner member. The upper surface of the peripheral wall of the bottom portion 15 of the outer member 3 abuts against the rear surface of the attachment receiving member 21. Further, the upper surface of each wall portion 30 formed on the upper surface of the base body 6 of the inner member 2 abuts against the rear surface of the attachment receiving member 21. Thereby, the inner member 2 and the outer member 3 are locked and the attachment member 4 is attached to the attachment receiving member 21.

As described above, in a state in which the first projection 19 of each engagement piece 18 of the outer member 3 is engaged with the engagement groove 11 and the outer member 3 is inserted into the attachment hole 22 of the attachment receiving member 21 and the peripheral wall 14 of the bottom portion 15 abuts against the peripheral portion of the attachment hole 22, the attachment member 4 is pressed from its surface opposite to one where the inner member 2 is provided toward the attachment receiving member 21. Thereby, the first projection 19 of each engagement piece 18 is engaged with the second engagement hole in the locked state while each engagement piece 17 receiving the cam operation due to each slanted cam portion 9 so as to be elastically deformed outwardly. Therefore, in order to attach the attachment member 4 to the attachment receiving member 21, after the inner member 2 and the outer member 3 which are maintained in the provisionally locked state are inserted into the attachment hole 22 of the attachment receiving member 21 such that the clip 1 is supported by the attachment receiving member 21, the inner member 2 is pressed toward the attachment receiving member 21 with the attachment member 4 such that the operation wall 7 is further inserted into the insertion portion 16 of the outer member 3. This simple operation enables the attachment member 4 to be attached to the attachment receiving member 21 via the outer member 3 and the inner member 2 of the clip 1.

As shown in FIGS. 11 and 12, the upper surface of the peripheral wall 14 of the bottom portion 15 of the outer member 3 abuts against the rear surface of the attachment receiving member 21, and the upper surface of each wall portion 30 which is formed on the upper surface of the base body 6 of the inner member 2 abuts against the rear surface of the attachment receiving member 21. Further, each pair of contact pieces 32 are inserted into the positioning hole 33 while being elastically deformed inwardly. This enables the inner member 2 and the outer member 3 to be locked with each other and the attachment member 4 is attached to the attachment receiving member 21.

According to the clip 1 of this embodiment, as explained above, the contact pieces 32 of the outer member 3 do not correspond to the positioning hole 33 of the inner member 2 and located in a position so as not to be inserted into the positioning hole 33, while the operation wall 7 of the inner member 2 is inserted into the insertion portion 16 of the outer member 3 such that the engagement piece 17 does not receive the cam operation due to the slanted cam portion 9. Therefore, in the provisionally locked state before the outer member 3 which does not receive the cam operation due to the slanted cam portion 9 is attached to the attachment receiving member 21 via the engagement piece 17, it is surely prevented that the contact pieces 32 are inserted into the positioning hole 33 and the inner member 2 and the outer member 3 are erroneously locked. The contact pieces 32 of the outer member 3 are elastically deformed inwardly so as to positioned to be inserted into the positioning hole 33 when the outer member 3 is inserted into the attachment hole 22 of the attachment receiving member 21 with maintaining the state in which the engagement piece 17 does not receive the cam operation due to the slanted cam portion 9. Therefore, when the outer member 3 is attached to the attachment receiving member 21, the contact pieces 32 of the outer member 3 are inserted into the positioning hole 33 of the inner member 2. This enables the inner member 2 and the outer member 3 to be locked with each other.

This surely prevents that the outer member 3 and the inner member 2 are erroneously locked while the clip 1 is transported with maintaining the provisionally locked state of the inner member 2 and the outer member 3 or while the outer member 3 is inserted into the inner member 2.

When the provisionally locked outer member 3 and inner member 2 are inserted into the attachment hole 22 of the attachment receiving member 21 while being maintained integrally with each other, the contact pieces 32 are elastically deformed inwardly and located in a position so as to be inserted into the positioning hole 33. Therefore, the contact pieces 32 can be inserted into the positioning hole 33 when the outer member 3 and the inner member 2 are inserted into the attachment hole 22 of the attachment receiving member 12. This maintains the provisionally locked state of the outer member 3 and the inner member 2 quite safely.

Since the engagement piece 19 is engaged with the engagement groove 11 while the operation wall 7 being inserted into the insertion portion 16 of the outer member 3 and the engagement piece 17 not receiving the cam operation due to the slanted cam portion 9, the outer member 3 and the inner member which are provided to the attachment member 4 can be always handled integrally with each other.

In this state, since the engagement piece 17 of the outer member 3 does not receive the cam operation due to the slanted cam portion 9, the engagement piece 17 is not elastically deformed. Therefore, the elastic force of the engagement piece 17 is surely prevented from reducing, while the outer member 3 and the inner member 2 are provisionally locked with each other.

The engagement piece 18 is engaged with the engagement hole 12 so as to be in a locked state, in a state where the operation wall 7 is further inserted into the insertion portion 16 while the engagement piece 18 being engaged with the engagement groove 11 and the engagement piece 17 receives the cam operation due to the slanted cam portion 9 so as to be elastically deformed outwardly. As described above, after the provisionally locked inner member 2 and outer member 3 are inserted into the attachment hole 22 of the attachment receiving member 21 such that the clip 1 is supported by the attachment receiving member 21, the inner member 2 is pressed toward the attachment receiving member 21 with the attachment member 4 such that the operation wall 7 is further inserted into the insertion portion 16 of the outer member 3. This simple operation enables the attachment member 4 to be attached to the attachment receiving member 12 via the outer member 3 and the inner member 2 of the clip 1.

The present invention is not limited to the illustrated embodiment. It is a matter of course that various improvements and modifications are possible as far as not departing from the spirit of the present invention.

The present invention provides a clip which is capable of reliably preventing the inner member and the outer member from being erroneously in a locked state before the outer member being attached to the attachment receiving member, in a state where the inner member and the outer member, which form the clip, are always handled integrally with each other in a provisionally locked state, and which also enables attachment of the attachment member to the attachment receiving member in an extremely easy one-touch operation.

The invention claimed is:

1. A clip comprising:
   an inner member provided on an attachment member and having an operation wall; and
   an outer member having an insertion portion where the operation wall of the inner member is inserted and having an engagement piece which elastically deforms as the operation wall of the inner member is inserted into the insertion portion, wherein the outer member is inserted into an attachment hole of an attachment receiving member and the operation wall of the inner member is inserted into the insertion portion of the outer member such that the engagement piece of the outer member is elastically deformed and the attachment member is attached to the attachment receiving member, wherein:
   the outer member has elastically deformable contact pieces which extend from a surface of the outer member where the engagement piece is formed and from a surface opposite to the surface, and the inner member has a slanted cam portion which is formed on one end surface of the operation wall and a positioning hole which is formed so as to correspond to the contact pieces of the outer member,
   at least a portion of the contact pieces face outside of a perimeter of the positioning hole and are located in a position so as not to be inserted into the positioning hole in a state where the operation wall of the inner member is inserted into the insertion portion of the outer member and the engagement piece does not receive a cam operation due to the slanted cam portion, and when the outer member is inserted into the attachment hole of the attachment receiving member with maintaining the state where the engagement piece does not receive the cam operation due to the slanted cam portion, the contact pieces are elastically deformed inwardly and located in a position so as to be inserted into the positioning hole.

2. The clip according to claim 1, wherein:
   the operation wall of the inner member has an engagement groove which is formed next to the slanted cam portion and an engagement hole which is formed next to the engagement groove,
   the outer member has an engagement projection which is formed next to the engagement piece,
   the engagement projection is engaged with the engagement groove in a state where the operation wall of the inner member is inserted into the insertion portion of the outer member and the engagement piece does not receive the cam operation due to the slanted cam portion, and the engagement piece is engaged with the engagement hole in a state where the operation wall is further inserted into the insertion portion and the engagement piece receives the cam operation due to the slanted cam portion so as to be elastically deformed outwardly.

3. The clip according to claim 2, wherein:
   a thin plate portion is formed at a distal end of the slanted cam portion, and the engagement piece contacts the thin plate portion in a state where the engagement piece does not receive the cam operation due to the slanted cam portion.

4. The clip according to claim 1, wherein:
   a thin plate portion is formed at a distal end of the slanted cam portion, and the engagement piece contacts the thin plate portion in a state where the engagement piece does not receive the cam operation due to the slanted cam portion.

* * * * *